US008413130B2

(12) United States Patent
Madduri (10) Patent No.: US 8,413,130 B2
(45) Date of Patent: Apr. 2, 2013

(54) SYSTEM AND METHOD FOR SELF POLICING OF AUTHORIZED CONFIGURATION BY END POINTS

(75) Inventor: Hari Haranath Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1581 days.

(21) Appl. No.: 11/866,420

(22) Filed: Oct. 3, 2007

(65) Prior Publication Data

US 2009/0094462 A1    Apr. 9, 2009

(51) Int. Cl.
*G06F 9/45* (2006.01)
(52) U.S. Cl. ......... 717/168; 717/170; 717/174; 717/177
(58) Field of Classification Search .................. None
See application file for complete search history.

(56) References Cited

U.S. PATENT DOCUMENTS

| | | | | |
|---|---|---|---|---|
| 5,944,821 | A * | 8/1999 | Angelo | 726/22 |
| 6,675,295 | B1 | 1/2004 | Marcelais et al. | 713/1 |
| 6,694,434 | B1 * | 2/2004 | McGee et al. | 713/189 |
| 6,721,880 | B1 | 4/2004 | Pike | 713/1 |
| 6,986,133 | B2 * | 1/2006 | O'Brien et al. | 717/173 |
| 6,993,650 | B2 * | 1/2006 | Landers et al. | 713/100 |
| 7,024,548 | B1 | 4/2006 | O'Toole, Jr. | 713/1 |
| 7,203,723 | B2 * | 4/2007 | Ogawa | 709/203 |
| 7,350,204 | B2 * | 3/2008 | Lambert et al. | 717/172 |
| 7,360,082 | B1 * | 4/2008 | Berthold et al. | 713/157 |
| 7,480,907 | B1 * | 1/2009 | Marolia et al. | 717/174 |
| 7,555,749 | B2 * | 6/2009 | Wickham et al. | 717/168 |
| 7,757,269 | B1 * | 7/2010 | Roy-Chowdhury et al. | 726/1 |
| 7,761,538 | B2 * | 7/2010 | Lin et al. | 709/220 |
| 7,797,332 | B1 * | 9/2010 | Bove et al. | 707/769 |
| 7,890,925 | B1 * | 2/2011 | Wyatt et al. | 717/106 |
| 7,890,997 | B2 * | 2/2011 | Walker et al. | 726/18 |
| 8,051,028 | B2 * | 11/2011 | Karnik et al. | 706/48 |
| 2004/0049561 | A1 | 3/2004 | Tafazolli et al. | 709/220 |
| 2004/0059802 | A1 | 3/2004 | Jacquemot et al. | 709/220 |
| 2005/0044545 | A1 * | 2/2005 | Childress et al. | 717/177 |
| 2005/0055687 | A1 * | 3/2005 | Mayer | 717/173 |
| 2005/0132348 | A1 * | 6/2005 | Meulemans et al. | 717/168 |
| 2005/0132349 | A1 * | 6/2005 | Roberts et al. | 717/168 |

(Continued)

OTHER PUBLICATIONS

H. Madduri, S. S. B. Shi, R. Baker, N. Ayachitula, L. Shwartz, M. Surendra, C. Corley, M. Benantar, and S. Patel. 2007. A configuration management database architecture in support of IBM service management. IBM Syst. J. 46, 3 (Mar. 2007), 441-457.*

(Continued)

*Primary Examiner* — Wei Zhen
*Assistant Examiner* — Matthew Brophy
(74) *Attorney, Agent, or Firm* — Van Leeuwen & Van Leeuwen; Jeffrey S. LaBaw (57) ABSTRACT

A system, method, and program product is provided that distributes authorized changes to the organization's entities and has the individual computer systems police configuration changes. A system receives change approval packages, each of the change approval packages including authorized change identification data that identifies authorized changes to the system. The authorized change identification data are stored in a storage area of the system. Subsequently, a change package is received by the computer system. The change package includes a change to the computer system and metadata that identifies the change. The metadata is compared with the authorized change identification data. If the metadata matches one of the authorized change identification data, then the change is installed, otherwise the change is rejected.

17 Claims, 5 Drawing Sheets

U.S. PATENT DOCUMENTS

| | | | | |
|---|---|---|---|---|
| 2005/0257209 A1* | 11/2005 | Adams et al. | | 717/168 |
| 2006/0080656 A1* | 4/2006 | Cain et al. | | 717/174 |
| 2006/0184792 A1* | 8/2006 | Berlin | | 713/165 |
| 2006/0294220 A1 | 12/2006 | Asahara | | 709/224 |
| 2007/0118646 A1* | 5/2007 | Gassoway | | 709/225 |
| 2007/0143629 A1* | 6/2007 | Hardjono et al. | | 713/189 |
| 2007/0234331 A1* | 10/2007 | Schow et al. | | 717/168 |
| 2008/0148248 A1* | 6/2008 | Volkmer et al. | | 717/168 |
| 2008/0222732 A1* | 9/2008 | Caldwell et al. | | 726/26 |
| 2008/0244553 A1* | 10/2008 | Cromer et al. | | 717/168 |
| 2009/0193521 A1* | 7/2009 | Matsushima et al. | | 726/22 |

OTHER PUBLICATIONS

Naga Ayachitula, Melissa Buco, Yixin Diao, Bradford Fisher, David Loewenstern, and Chris Ward. 2007. IT service management automation: an automation centric approach leveraging configuration control, audit verification and process analytics. In Proceedings of the Distributed systems: operations and management 18th IFIP/IEEE international conference.*

\* cited by examiner

SYSTEM AND METHOD FOR SELF POLICING OF AUTHORIZED CONFIGURATION BY END POINTS

BACKGROUND OF THE INVENTION

1. Technical Field

The present invention relates to a system and method that polices authorized configurations by end points. More particularly, the present invention relates to a system and method where end points, such as computer systems, receive authorized configurations and changes to the end points are allowed or rejected based on a comparison with the authorized configuration.

2. Description of the Related Art

Configuration management is a very important problem in many disciplines including software development, data centers, aircraft designs, process control systems etc. Among configuration management, managing server configurations in data centers is an increasingly important and complex task. Information Technology Infrastructure Library (ITIL) is an integrated set of best-practice recommendations with common definitions and terminology. ITIL best practices advocates having a configuration management database (CMDB) and a rigorous change process to control the changes to Configuration Items ("Cis"). Configuration Items are generally records in the CMDB database as well as the actual entities (e.g., servers) that correspond to the Configuration Items. A configuration management database (CMDB) is a repository of information related to the components of an information system. Although repositories similar to CMDBs have been used by IT departments for many years, the term CMDB stems from ITIL. In the ITIL context, a CMDB represents the authorized configuration of the significant components of the IT environment. A CMDB helps an organization understand the relationships between these components and track their configuration. The CMDB is a fundamental component of the ITIL framework's Configuration Management process.

The CMDB is used to store both authorized configurations of the entities (systems) being managed by the organization as well as the actual configurations of such entities. One way that actual configurations are gathered and stored in the CMDB is through a process of "discovery." During discovery, the systems send actual configuration data back to a configuration management server that includes the actual configuration data in the CMDB. An "audit" process is performed on the CMDB to reveal discrepancies between the authorized configurations and the actual configurations. A process of "remediation" is then performed to address such discrepancies. Despite the usefulness of CMDB to manage an organization's computing entities, the current state of the art faces particular challenges.

One challenge of using current CMDB technologies is that it does not prevent an unauthorized change from being made to one or more entities being managed by the organization. Currently, unauthorized changes are addressed by the audit and remediation processes outlined above. However, unauthorized changes can result in various problems including failure of various applications being run by the organization's entities. When unauthorized changes cause such problems, the audit and remediation processes are used to identify and address the problems. However, the audit and remediation processes consume valuable time and resources and may result in a mission-critical application being unavailable, or failing, for an extended period of time.

SUMMARY

It has been discovered that the aforementioned challenges are resolved using a system, method and computer program product that distributes authorized changes to the organization's entities (computer systems) and has the individual computer systems police configuration changes made to the systems. The computer system receives one or more change approval packages, with each of the change approval packages including authorized change identification data that identifies one or more authorized changes to the computer system. The received authorized change identification data are stored in a storage area, such as a hard drive, of the computer system. Subsequently, a change package is received by the computer system. The sender of this change package is typically a process (or system or product) that is responsible for implementing changes. The change package includes a change to the computer system, such as a software or hardware change, and metadata that identifies the change. The received metadata is then compared with the stored authorized change identification data. If the received metadata matches one of the stored authorized change identification data, then the change is installed on the computer system. On the other hand, if the received metadata does not match one of the stored authorized change identification data, then the change is rejected.

In one embodiment, the change approval package is a result of an approved request for change that is stored in an authorized configurations area of a separate configuration management database prior to being received at the computer system. In this embodiment, the configuration control agent is responsible for locally maintaining the authorized configuration for the computer system.

In another embodiment, the change is a software file to be installed on the computer system. In this embodiment, the authorized change identification data includes a first hash result. After the computer system receives the software file, it processes the software file using a hashing algorithm, resulting in a second hash result. In this embodiment, the software file is only installed if the first hash result received with the authorized change identification data matches the second hash result that resulted from the computer system running the hashing algorithm.

In a further embodiment, if the first hash result does not equal the second hash result, rather than rejecting the change, a manual override process is performed. During this process, a manual override is requested from a user. If the user provides the manual override, then the software file is installed, otherwise it is rejected. In this further embodiment, the user can be contacted using a computer network, such as the Internet, and does not have to be directly using the computer system.

In one embodiment, when the change approval packages are received, a sender identity is retrieved from each of the change approval packages. The sender identities are then compared to a list of authorized senders. If the sender matches one of the authorized senders, then the change approval package is stored, otherwise the change approval package is rejected.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
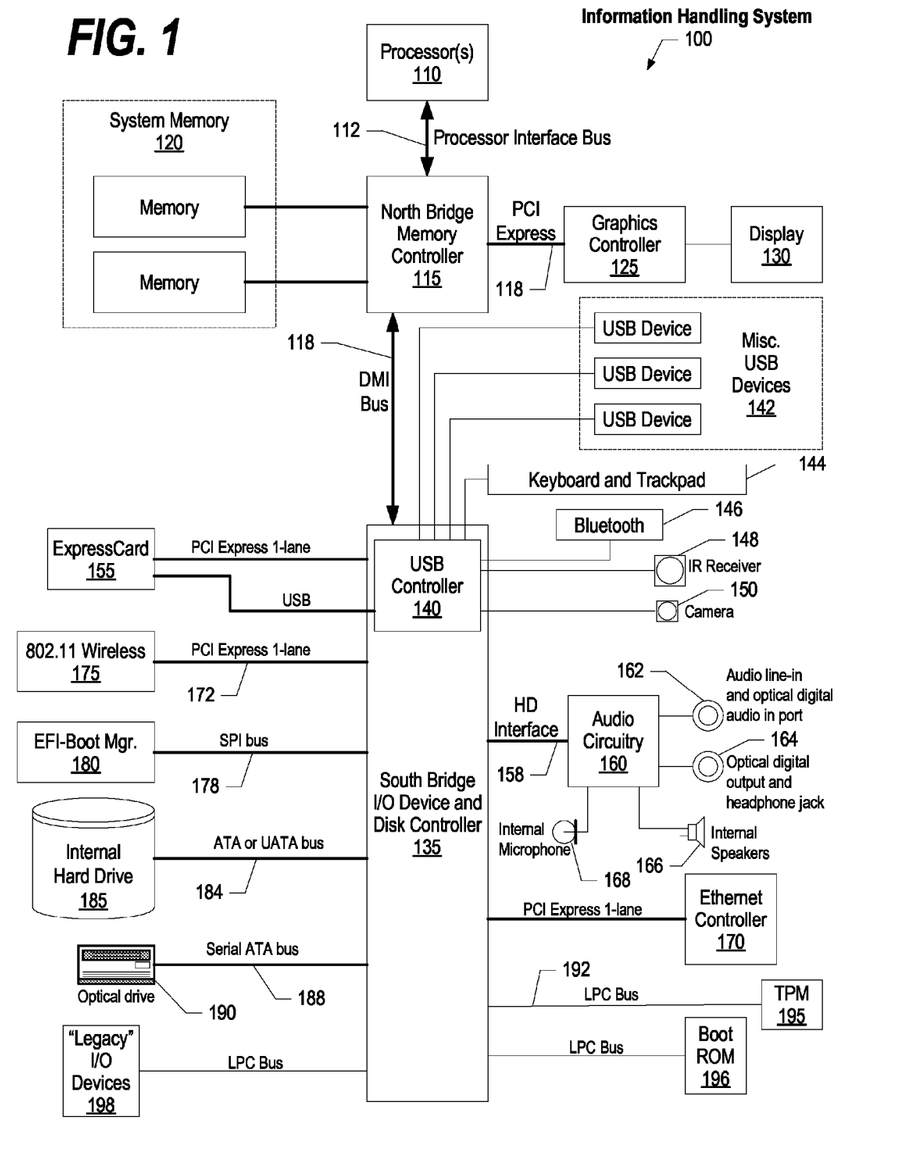
FIG. 1 is a block diagram of a data processing system in which the methods described herein can be implemented.
Figure 2:
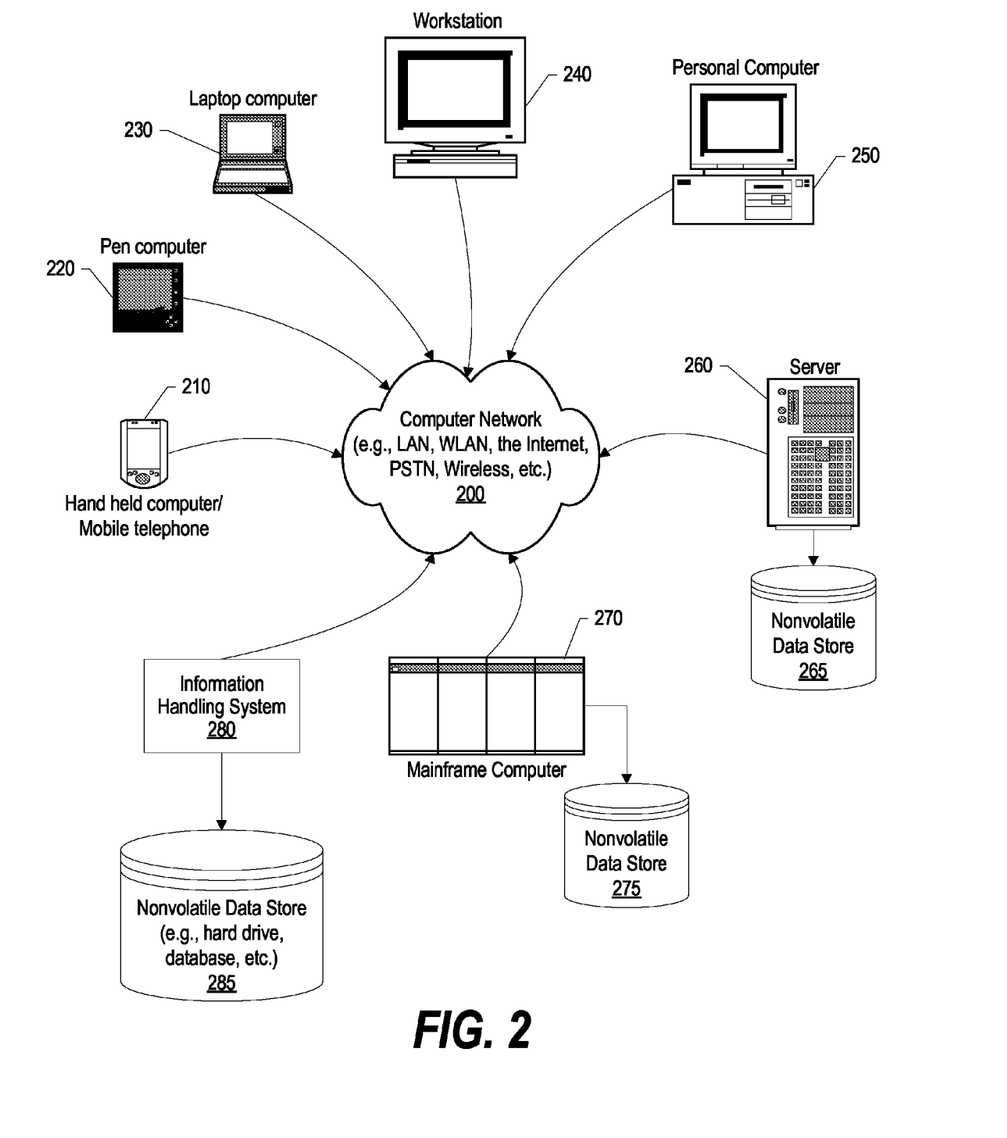
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
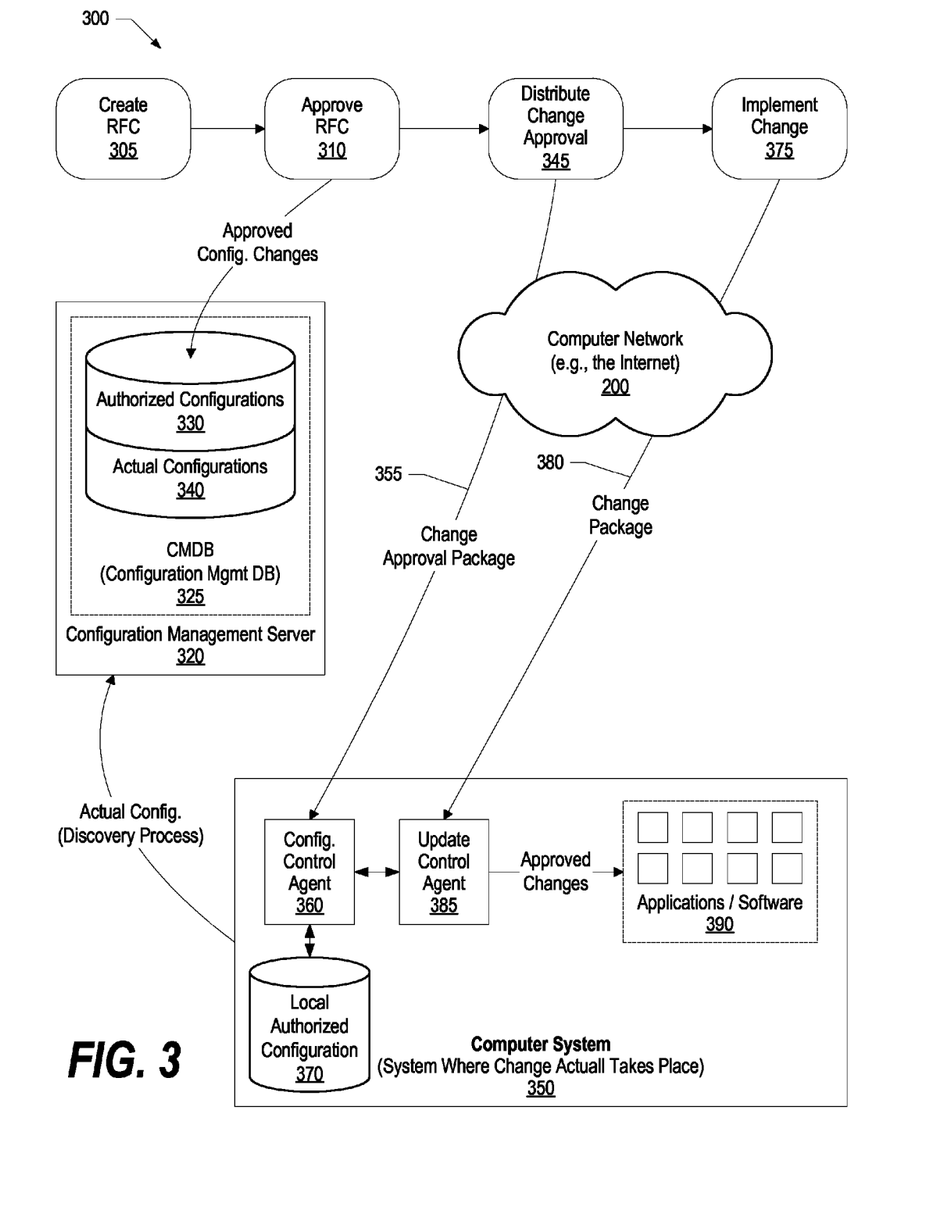
FIG. 3 is a diagram showing various entities and processes used to provide change approval packages and change packages to a computer system.

FIG. 3 is a diagram showing various entities and processes used to provide change approval packages and change packages to a computer system. Request for change processing 300 includes process 305 where a request for change (RFC) is created. At this point, the created request for change has not yet been approved for installation. Requests for change can include a myriad of types of changes to systems, such as software updates (e.g., new software installations, upgraded versions, etc.), hardware changes (e.g., new components, upgraded components, etc.), and other changes to a computer system. At process 310, the request for change that was created in process 305 is approved. The approved request for change results in one or more authorized configuration changes that are stored in Configuration Management Database (CMDB) 325.

As shown, Configuration Management Database 325 includes two types of information—authorized configurations 330 and actual configurations 340. The approved configuration changes resulting from the approval of the request for change in process 310 are added to authorized configurations 330. In one embodiment, such as at a large or medium sized organization, the Configuration Management Database is hosted on Configuration Management Server 320. Configuration Management Database 325 can maintain configuration data for many different computer systems. In one embodiment, the data stored in actual configurations 340 is obtained during a "discovery" process that analyzes individual systems in the organization and reports the individual systems' actual configurations back to Configuration Management Server 320. An audit can then be performed comparing systems' authorized configurations with their actual configurations. Discrepancies between a system's actual and authorized configurations can be investigated, especially when a system is experiencing problems.

After the request for change has been approved, the change approval is distributed to the affected system, or systems, at process 345. Change approval package 355 includes authorized change identification data that identifies one or more changes authorized to be made to the computer system. Change approval package 355 is transmitted through computer network 200 to computer system 350. For example, the authorized change may be for a database management system (DBMS) that executes on the computer system be upgraded from version "A" to version "B."

Computer system 350 is the system where the authorized changes are intended to take place. Process 360, running at computer system 350, receives change approval package 355 and extracts the authorized changes. Using the example from above, the authorized change might be to upgrade the system's DBMS from version "A" to version "B." Configuration control agent 360 stores one or more records in local authorized configuration data store. Using the example from above, this record (or records) would indicate that the system has an authorized configuration of the DBMS running at version "B."

Returning to the enterprise-level change control process, at process 375 the approved changes are implemented. Process 375 transmits change package 380 via computer network 200 to computer system 350. Change package 380 includes metadata that identifies the particular change. If the change is a software upgrade, change package 380 also includes the software installation code that will be executed. At computer system 350, update control agent 385 receives the change package and uses the metadata to match the change that is being received with one or more records stored by the configuration control agent in local authorized configuration data store 370. If the metadata matches data in the local authorized configuration data store, then the change is accepted (e.g., installed), however if the metadata does not match, then the change is rejected. Using the example from above, if a DBMS version "A" is one of the applications/software 390 currently running on the system, and the system has been approved to be upgraded to DBMS version "B," if change package is install code for the DBMS version "B" and the metadata indicates that the change package is for DBMS version "B," then update control agent 385 will receive and accept the change resulting in DBMS version "B" being installed in applications/software 390 running on computer system 350. However, if the change package is for something else, such as DBMS version "X," then because the metadata in change package 380 does not match the record in local authorized configuration data store 370, the change is rejected.

Figure 4:
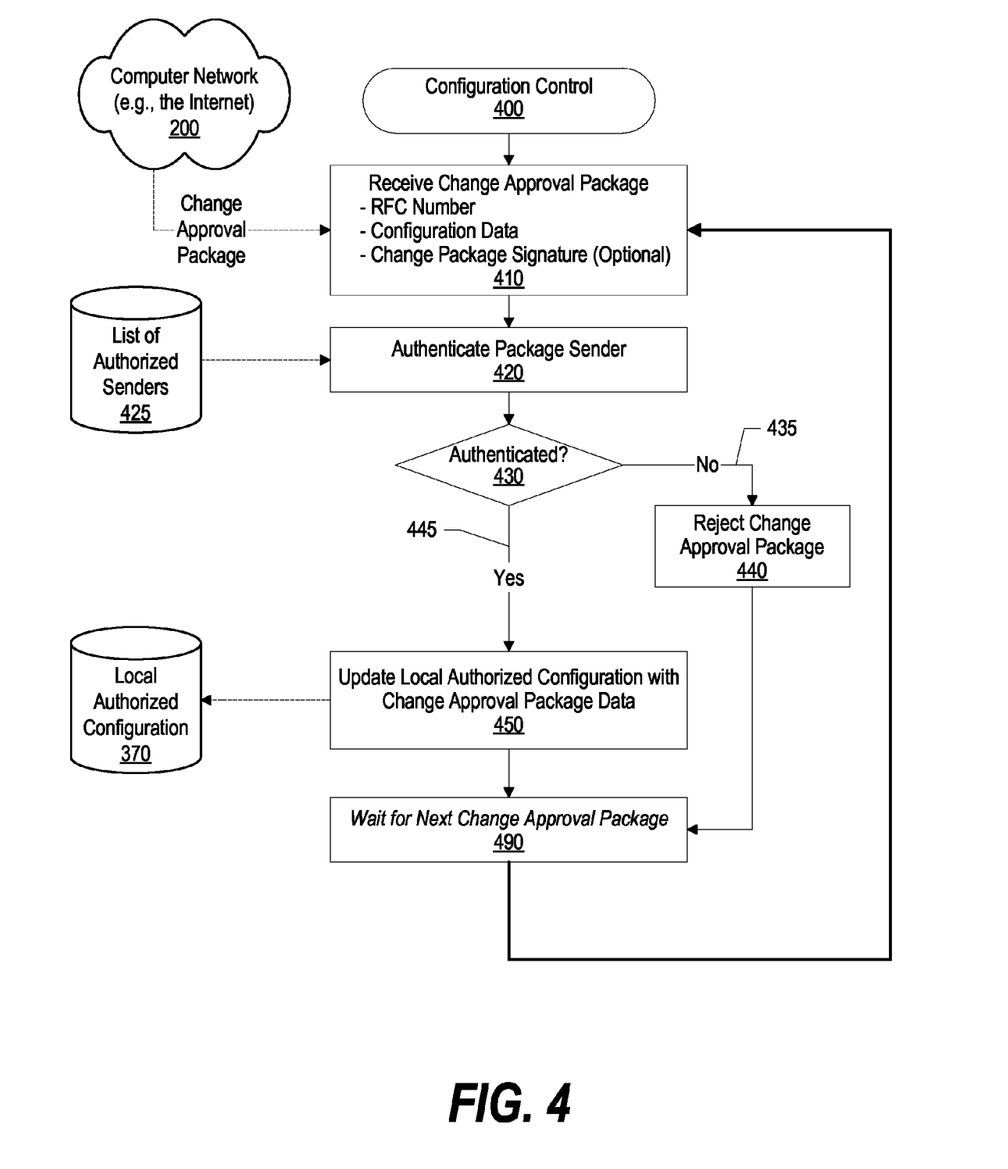
FIG. 4 is a flowchart showing steps taken by the configuration control agent running on the computer system.

FIG. 4 is a flowchart showing steps taken by the configuration control agent running on the computer system. Processing commences at 400 whereupon, at step 410, the configuration control agent receives a change approval package via computer network 200. As shown, the change approval package includes various data regarding the approved request for change. This data includes a unique RFC number that is used to track this request for change, configuration data that describes the approved change. In one embodiment, the change approval package further includes a change package digital signature. Using the example introduced in the description of FIG. 3 where the request for change related to upgrading the system's DBMS from version "A" to version "B," the digital signature included in the change approval package might be a hash value of the installation code used to install version "B" of the DBMS. When the actual installation code is received at a later time, the installation code included in the change package can be hashed using a hash function (such as the SHA-1 hash function) and the result can be compared with the signature value that was included in the change approval package. In this manner, if version "X" of the DBMS was erroneously sent to the system and labeled as version "B," the hash value of version "X" would not match the expected has value of version "B" and the change could be rejected, preventing problems or damage to the computer system.

At step 420, in one embodiment the package sender is authenticated by reviewing a list of authorized senders (e.g., network addresses, etc.) stored in data store 425. In this embodiment, a determination is made as to whether the sender from which the change approval package originated is on the list of authorized senders (decision 430). If the sender is not authenticated, then decision 430 branches to "no" branch 435 whereupon, at step 440, the change approval package is rejected. On the other hand, if the sender is authenticated (or if sender authentication is not being used), then decision 430 branches to "yes" branch 445 whereupon, at step 450, local authorized configuration data store 370 is updated with the change approval package data, including the RFC number, the configuration data, and, if included, the change package signature. At step 490 the configuration control agent waits for the next change approval package. When the next package is received, processing loops back to step 410 to receive and process the package.

Figure 5:
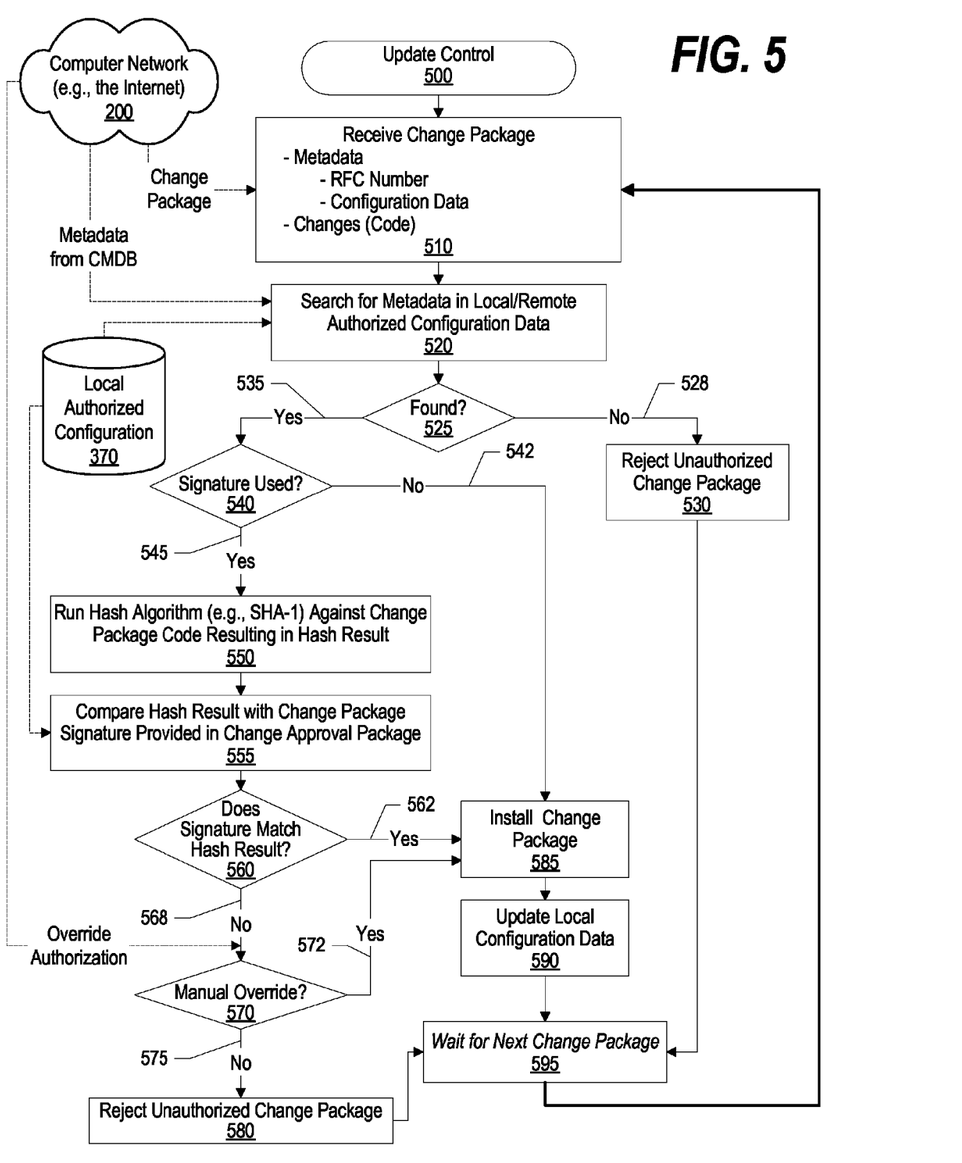
FIG. 5 is a flowchart showing steps taken by the update control agent that is running on the computer system.

FIG. 5 is a flowchart showing steps taken by the update control agent that is running on the computer system. Processing commences at 500 whereupon, at step 510, the update control agent receives a change package via computer network 200. As indicated, the change package includes metadata describing the change as well as changes, such as installation code, intended to be made at the computer system. Metadata includes an RFC number and configuration data describing the change. Using the example introduced in FIG. 3 and used in FIG. 4 where the change is to upgrade the system's DBMS from version "A" to version "B," the RFC number would match the RFC number that was included in the change approval package received in FIG. 4, and the configuration data would describe the change as being an installation of the DBMS version "B." If the change to the computer system is a software change, the change package would also include installation code that is executed to install the new or upgraded software. In this case, the code would be installation code to install DBMS version "B."

At step 520, records in local authorized configuration data store 370 are searched for the received metadata (e.g., the RFC number and the configuration data). In one embodiment, the local authorized configuration data is stored in the Configuration Management Database (see Authorized Configurations 330 in Configuration Management Database 325 in FIG. 3). In this embodiment, the local authorized configuration data is retrieved by sending a request to a second computer system such as Configuration Management Server 320 shown in FIG. 3. The second computer system retrieves the local authorized configuration data from the CMDB and returns the data to the computer system at step 520. A determination is made as to whether the metadata was found in the local authorized configuration data (decision 525). If the metadata was not found in the local authorized configuration data, then decision 525 branches to "no" branch whereupon, at step 530, the unauthorized change package is rejected and, at step 595, the update control agent waits for the next change package. On the other hand, if the metadata was found in the local authorized configuration data, then decision 525 branches to "yes" branch 535 to process the change package.

A determination is made as to whether a digital signature was included in the change approval package that was received in FIG. 4 (decision 540). If a digital signature was used, indicated by a digital signature field in the records stored in local authorized configuration data store not being blank or zero, then decision 540 branches to "yes" branch 545 to compare the signature against the actual code received in the change package. At step 550, the same hash algorithm that was used to generate the digital signature that is stored in data store 370 (e.g., SHA-1) is executed against the change package code resulting in a hash result. Using the DBMS upgrade example introduced earlier, the digital signature stored in data store 370 would be the hash value that was included in the original change approval package that was received in FIG. 4 by the configuration control agent. In the example used, the hash value would be the hash value of the installation code used to install DBMS version "B." At step 550, the update control agent runs the same hashing algorithm against the received installation code that has been indicated to be for DBMS version "B." At step 555 the hash result from step 550 is compared to the signature that was provided in the change approval package.

A determination is made as to whether the hash result matches the stored digital signature (decision 560). If the hash result matches the stored digital signature, then decision 560 branches to "yes" branch 562 whereupon, at step 585 the change package is installed (e.g., the installation code for DBMS version "B" is executed). On the other hand, if the hash result does not match the stored digital signature, then decision 560 branches to "no" branch 568 whereupon a manual override is requested from a user alerting the user of the discrepancy between the expected and actual hash result. A determination is made as to whether the manual override has been provided (decision 570). If a manual override is provided, then decision 570 branches to "yes" branch 572 whereupon, at step 585, the change package is installed (e.g., the installation code for DBMS version "B" is executed). On the other hand, if the manual override is not provided or approved, then decision 570 branches to "no" branch 575 whereupon, at step 580, the unauthorized change package is rejected, and, at step 595, the update control agent waits for the next change package. An example of when a manual override may be needed would be when a minor fix has been made to the installation code after the change approval package was sent to the computer system. Because of the minor fix, the hash result of the change code will no longer match the expected hash value. In this case, the manual override procedure can be use to allow installation of the change code.

Returning to step 585, the change package is installed (e.g., the installation code for DBMS version "B" is executed), as previously described. At step 590, the local configuration data is updated as needed (e.g., indicating that DBMS version "B" has been installed, or if the change was a hardware change, noting that the hardware change has been implemented, etc.). After the change has been installed and any needed configuration data has been updated, at step 595 the update control agent waits for the next change package to be received. When the next change package is received, update control agent processing loops back to step 510 to receive and process the next change package.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving one or more change approval packages at a first computer system from a second computer system including a configuration management database, each of the change approval packages including authorized change identification data that identifies one or more authorized changes of at least one configuration item in the first computer system, and wherein each change approval package is a result of an approved request for change that is stored in an authorized configurations area of the configuration management database prior to being received at the first computer system;
   storing the received authorized change identification data in an authorization configuration storage area associated with the first computer system;
   in response to the storing, receiving a change package at the first computer system, the change package including a change to at least one configuration item in the first computer system and metadata that identifies the change;
   comparing, by the first computer system, the received metadata with the stored authorized change identification data;
   installing the change on the first computer system in response to the comparison revealing that the received metadata matches one of the stored authorized change identification data; and
   rejecting the change in response to the comparison revealing that the received metadata does not match any of the stored authorized change identification data, wherein the rejecting prevents unauthorized application of the change package to the first computer system before the change package is applied.

2. The method of claim 1 wherein the change is a software file and the authorized change identification data includes a first hash result, the method further comprising:
   processing the software file using a hashing algorithm, the processing resulting in a second hash result; and
   wherein installing the change further comprises installing the software file on the first computer system in response to the first hash result being equal to the second hash result.

3. The method of claim 2 wherein, when the first hash result does not equal the second hash result, the method further comprises:
   requesting a manual override from a user;
   receiving a reply from the user;
   installing the change which includes installing the software file on the first computer system in response to the user's reply being an override authorization; and
   rejecting the change in response to not receiving an override authorization in the user's reply.

4. The method of claim 3 further comprising:
   sending the manual override request to the user over a computer network, wherein the user is using a third computer system; and
   receiving the reply from the user over the computer network.

5. The method of claim 1 wherein the authorization configuration storage area is included in the second computer system and the method further comprises:
   sending the received authorized change identification data to the second computer system where it is stored in the authorization configuration storage area; and
   after receiving the change package:
      requesting the stored authorized change identification data from the second computer system; and
      receiving the stored authorized change identification data from the second computer system in response to the requesting.

6. The method of claim 1 further comprising:
   creating a request for change;
   upon approval of the request for change, storing one or more authorized configuration changes in the configuration management database that is hosted by the second computer system, wherein authorized configurations of one or more computer systems, including the first computer system, are stored in the configuration management database, and wherein actual configurations of one or more computer systems, including the first computer system, are also stored in the configuration management database, wherein the actual configurations are obtained by performing a discovery process on the one or more computer systems;

processing one or more software files that correspond to one or more of the change approval packages using a hashing algorithm, the processing resulting in a first set of hash results;

distributing the change approval packages that correspond to the request for change to the first computer system, wherein at least one of the change approval packages includes one of the first set of hash results, wherein, when received by the first computer system, the change approval packages are stored in a local authorized configurations data store that is accessible from the first computer system;

sending the change to the first computer system, wherein the change includes a selected one of the software files;

processing at the first computer system the selected software file using the hashing algorithm, the processing resulting in a second hash result; and comparing, by the first computer system, one of the first hash results that was included in the change approval package that corresponds to the change package received at the first computer system, wherein installing the change further comprises installing the software file on the first computer system in response to the first hash result included in the change approval package being equal to the second hash result.

7. A information handling system comprising:
one or more processors;
a memory accessible by at least one of the processors;
a nonvolatile storage area accessible by at least one of the processors;
a network interface that connects the information handling system to a computer network;
a set of instructions stored in the memory and executed by at least one of the processors in order to perform actions of:
  receiving, via the network interface from a second information handling system connected to the computer network, the second information handling system including a configuration management database, one or more change approval packages, each of the change approval packages including authorized change identification data that identifies one or more authorized changes of at least one configuration item in the information handling system, and wherein each change approval package is a result of an approved request for change that is stored in an authorized configurations area of the configuration management database prior to being received at the information handling system;
  storing the received authorized change identification data in an authorization configuration storage area included in the nonvolatile storage area;
  in response to the storing, receiving, via the network interface from a third information handling system connected to the computer network, a change package at the information handling system, the change package including a change to the information handling system and metadata that identifies the change;
  comparing the received metadata with the stored authorized change identification data;
  installing the change on the information handling system in response to the comparison revealing that the received metadata matches one of the stored authorized change identification data; and
  rejecting the change in response to the comparison revealing that the received metadata does not match any of the stored authorized change identification data, wherein the rejecting prevents unauthorized application of the change package to the information handling system before the change package is applied.

8. The information handling system of claim 7 wherein the change is a software file and the authorized change identification data includes a first hash result, and wherein the set of instructions, when executed, cause at least one of the processors to perform further actions comprising:
  processing the software file using a hashing algorithm, the processing resulting in a second hash result; and
  wherein installing the change further comprises installing the software file on the information handling system in response to the first hash result being equal to the second hash result.

9. The information handling system of claim 8 wherein, when the first hash result does not equal the second hash result, the set of instructions, when executed, cause at least one of the processors to perform further actions comprising:
  requesting a manual override from a user;
  receiving a reply from the user;
  installing the change which includes installing the software file on the information handling system in response to the user's reply being an override authorization; and
  rejecting the change in response to not receiving an override authorization in the user's reply.

10. The information handling system of claim 9 further comprising:
  sending the manual override request to the user over the computer network via the network interface; and
  receiving the reply from the user over the computer network via the network interface.

11. The information handling system of claim 7 wherein the action of receiving the change approval packages further includes actions comprising:
  identifying a sender of each of the change approval packages;
  retrieving a list of one or more authorized senders from the nonvolatile storage area, wherein one or more of the change approval packages are stored in response to the sender of the one or more change approval packages being included in the list of authorized senders, and wherein at least one of the change approval packages are rejected in response to the sender of the at least one change approval packages not being included in the list of authorized senders.

12. A computer program product stored in a computer readable storage medium, comprising functional descriptive material that, when executed by an information handling system, causes the information handling system to perform actions that include:
  receiving one or more change approval packages at a first computer system from a second computer system including a configuration management database, each of the change approval packages including authorized change identification data that identifies one or more authorized changes of at least one configuration item in the first computer system, and wherein each change approval package is a result of an approved request for change that is stored in an authorized configurations area of the configuration management database prior to being received at the first computer system;

storing the received authorized change identification data in an authorization configuration storage area associated with the first computer system;

in response to the storing, receiving a change package at the first computer system, the change package including a change to the first computer system and metadata that identifies the change;

comparing, by the first computer system, the received metadata with the stored authorized change identification data;

installing the change on the first computer system in response to the comparison revealing that the received metadata matches one of the stored authorized change identification data; and rejecting the change in response to the comparison revealing that the received metadata does not match any of the stored authorized change identification data, wherein the rejecting prevents unauthorized application of the change package to the first computer system before the change package is applied.

13. The computer program product of claim 12 wherein the change is a software file and the authorized change identification data includes a first hash result, and wherein the functional descriptive material causes the data processing system to perform additional actions comprising:

processing the software file using a hashing algorithm, the processing resulting in a second hash result; and wherein installing the change further comprises installing the software file on the first computer system in response to the first hash result being equal to the second hash result.

14. The computer program product of claim 13 wherein, when the first hash result does not equal the second hash result, wherein the functional descriptive material causes the data processing system to perform additional actions comprising:

requesting a manual override from a user;

receiving a reply from the user;

installing the change which includes installing the software file on the first computer system in response to the user's reply being an override authorization; and rejecting the change in response to not receiving an override authorization in the user's reply.

15. The computer program product of claim 14 wherein the functional descriptive material causes the data processing system to perform additional actions comprising:

sending the manual override request to the user over a computer network, wherein the user is using a third computer system; and receiving the reply from the user over the computer network.

16. The computer program product of claim 12 wherein the authorization configuration storage area is included in the second computer system and the method further comprises:

sending the received authorized change identification data to the second computer system where it is stored in the authorization configuration storage area; and after receiving the change package:

requesting the stored authorized change identification data from the second computer system; and receiving the stored authorized change identification data from the second computer system in response to the requesting.

17. The computer program product of claim 12 wherein the functional descriptive material causes the data processing system to perform additional actions comprising:

creating a request for change;

upon approval of the request for change, storing one or more authorized configuration changes in a configuration management database that is hosted by the second computer system, wherein authorized configurations of one or more computer systems, including the first computer system, are stored in the configuration management database, and wherein actual configurations of one or more computer systems, including the first computer system, are also stored in the configuration management database, wherein the actual configurations are obtained by performing a discovery process on the one or more computer systems;

processing one or more software files that correspond to one or more of the change approval packages using a hashing algorithm, the processing resulting in a first set of hash results;

distributing the change approval packages that correspond to the request for change to the first computer system, wherein at least one of the change approval packages includes one of the first set of hash results, wherein, when received by the first computer system, the change approval packages are stored in a local authorized configurations data store that is accessible from the first computer system;

sending the change to the first computer system, wherein the change includes a selected one of the software files;

processing at the first computer system the selected software file using the hashing algorithm, the processing resulting in a second hash result; and comparing, by the first computer system, one of the first hash results that was included in the change approval package that corresponds to the change package received at the first computer system, wherein installing the change further comprises installing the software file on the first computer system in response to the first hash result included in the change approval package being equal to the second hash result.

* * * * *